Feb. 13, 1923.

V. CASTILLO

BEET LOADER

Filed Sept. 14, 1921

1,444,829

2 sheets-sheet 1

Inventor
V. Castillo

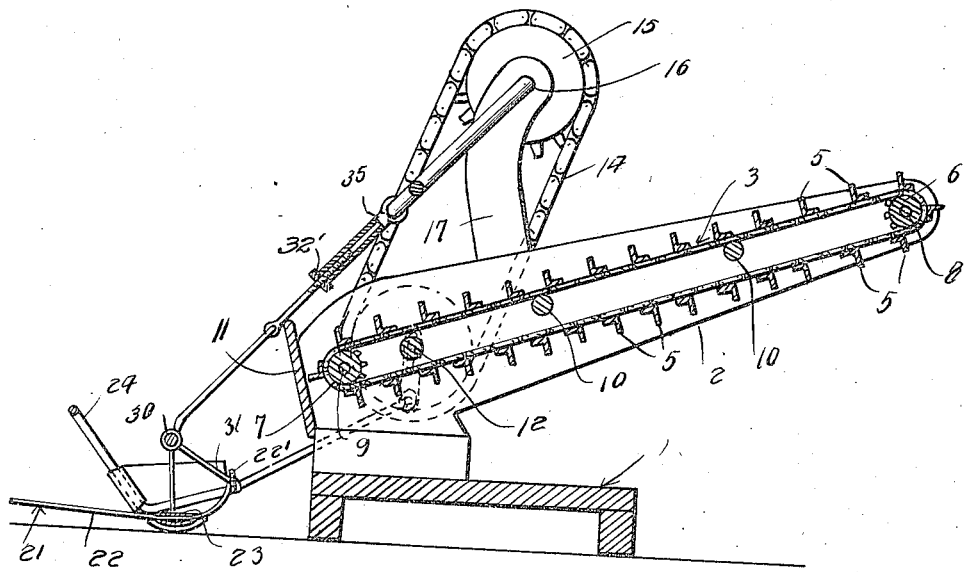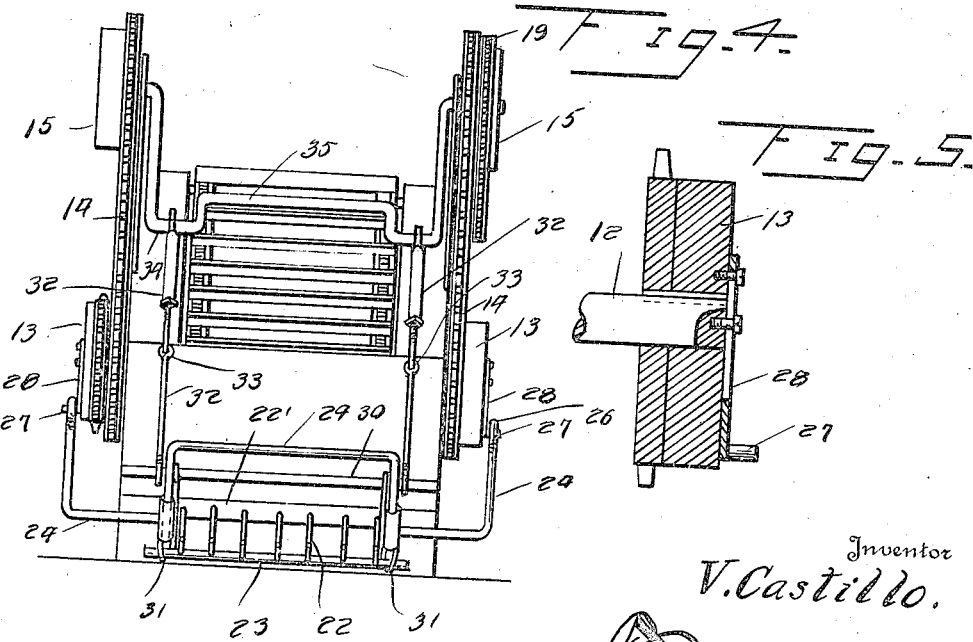

Patented Feb. 13, 1923.

1,444,829

UNITED STATES PATENT OFFICE.

VICTOR CASTILLO, OF FORT MORGAN, COLORADO.

BEET LOADER.

Application filed September 14, 1921. Serial No. 500,539.

*To all whom it may concern:*

Be it known that I, VICTOR CASTILLO, a citizen of the United States, residing at Fort Morgan, in the county of Morgan and State of Colorado, have invented certain new and useful Improvements in Beet Loaders; and I do hereby declare the following to be a full, clear, and exact description of the invention, such as will enable others skilled in the art to which it appertains to make and use the same.

This invention relates to new and useful improvements in beet loaders especially adapted for use at sugar refineries or other plants where beets are received in large quantities from the producers and are deposited in large piles to await use by the plant and has for its primary object the provision of a device which will gather the beets in large numbers from the pile and convey them to vehicles or the like employed for carrying the beets into the plant.

Another object of this invention is the provision of a beet loader of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1:
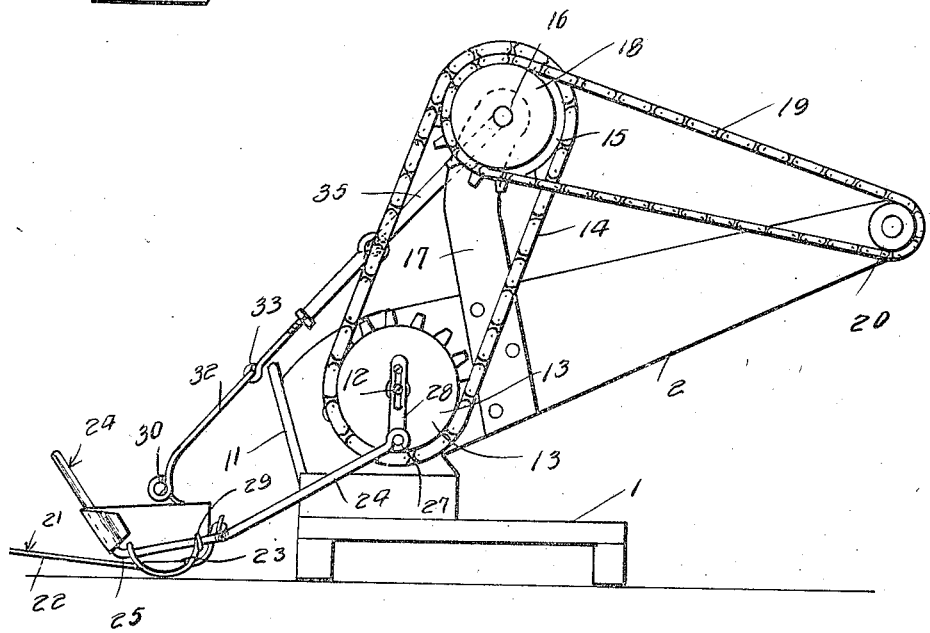
Figure 2:
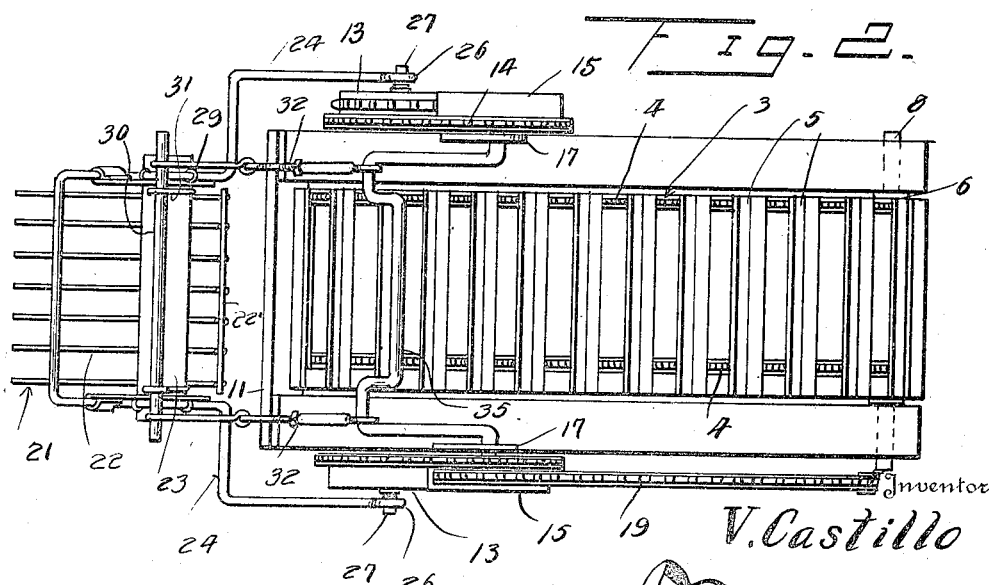

Figure 1 is a side elevation, illustrating a beet loader constructed in accordance with my invention, Figure 2 is a top plan view illustrating the same, Figure 3 is a longitudinal sectional view illustrating the conveyor and the association of the loading fork therewith, Figure 4 is a front elevation illustrating the device, Figure 5 is a detail sectional view illustrating a means for shortening and lengthening the stroke of the fork.

Referring in detail to the drawings the numeral 1 indicates a skid or base for supporting an upwardly inclined conveyor trough 2 and in which is mounted an endless conveyor 3. The conveyor trough 2 is supported upon the skid or base 1 at its forward end while its rear end is disposed a considerable distance above the ground so that a vehicle or the like may be positioned under said end to receive the beets from the conveyor. The conveyor is constructed from endless sprocket chains 4 connected at spaced intervals by transversely extending slats 5 and the sprocket chains are trained over sprocket wheels 6 and 7 secured to shafts 8 and 9. The shafts are rotatably supported by the sides of the conveyor trough 2 and the upper run of the conveyor passes over rollers 10 carried by the conveyor trough. The conveyor trough at its lower or forward end is closed by an end board 11 and the flights 5 when passing from the lower run of the conveyor to the upper run of said conveyor come in close contact with said end board so as to catch and cause the beets to move rearwardly on the conveyor.

A drive shaft 12 is journaled to the conveyor trough 2 and has secured to its ends exteriorly of said trough 2 sprocket wheels 13 one of which is extended to form a drive sprocket over which may be trained an endless chain from a power source. The sprocket wheels 13 have trained thereover sprocket chains 14 which are in turn trained over sprocket wheels 15 secured to an elevating shaft. The shaft 16 is supported by upwardly extending arms 17 that are secured to the conveyor trough 2. A sprocket wheel 18 is secured to the elevating shaft 16 adjacent to one of the sprocket wheels 15 and has trained thereover an endless sprocket chain 19 which in turn is trained over a sprocket wheel 20 secured to the shaft 8 for the purpose of driving the conveyor 3.

A fork 21 includes a plurality of tines 22 connected at their rear ends by a bar 22' and also by a bar 23. The bar 23 is spaced slightly from the bar 22' and the tines are curved upwardly from the bar 23 to the bar 22'. A substantially U-shaped frame 24 has its arm portions bent as illustrated at 25 to dispose the bight portion of said frame above the fork and the arms of the frame are again bent to dispose the free ends of said arms at each side of the conveyor trough 2. The free ends of the arms of the substantially U-shaped frame are provided with bearings 26 to receive pintles 27 formed on plates 28 and the latter are adjustably secured to the sprocket wheels 13. The plates being adjustably secured to the sprocket wheels permit the stroke of the fork to be lengthened and shortened as desired. The bar 23 of the fork is secured to the U-shaped frame by suitable brackets 29 and also has secured thereto an elevating bar 30 by brackets 31. The elevating bar is disposed above the fork and its substantially U-shape frame and has pivoted thereto elevating arms 32. The arms 32 each include a pair of sections connected by knuckle joints 33 and one of the sections having couplings 32′ to adjust the strokes of the fork. The arms 32 are journaled to portions 34 formed on a crank 35 of the elevating shaft 16. The rotation of the sprocket wheels 13 imparts a forward and rearward motion to the fork 21 and the rotation of the elevating shaft 16 causes said fork at the same time to raise upwardly and rearwardly to deposit the collected beets from a pile onto the conveyor and then return the fork into a position to pass under the beets in the pile when said fork is again moved forwardly. The beets deposited on the conveyor 3 are carried rearwardly in an upwardly inclined direction and deposited in a wagon or like vehicle positioned under the rear end of the conveyor trough, thus, it will be noted that a loader has been provided wherein beets may be easily and quickly loaded from a pile into a wagon for transportation to a plant or foreign point.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A beet loader including a supporting structure, a conveyor trough carried by said structure, a drive shaft carried by said trough, an endless conveyor in said trough, an elevating shaft journaled above the conveyor trough, means driving the elevating shaft by the drive shaft, said means including sprocket wheels and an endless chain, a fork eccentrically connected to certain of said sprocket wheels, and means connecting the fork to the elevating shaft.

2. A beet loader comprising a base, a conveyor carried by said base, a drive shaft associated with said conveyor, sprocket wheels secured to said drive shaft, an elevating shaft supported above the conveyor, a fork frame eccentrically connected to said sprocket wheels, a fork secured to said frame, means driving the conveyor by the elevating shaft, a bar secured to the fork, elevating arms connected to the elevating shaft and to the bar and each including a pair of sections pivotally connected to each other.

3. A beet loader comprising a supporting structure, an endless conveyor carried by said structure, and a fork associated with the conveyor, means to move said fork forwardly and rearwardly to collect beets from a pile, and means to move to said fork upwardly to dump the beets onto the conveyor when the fork is on its rearward journey.

4. A beet loader including a supporting structure, an endless conveyor carried by said structure, a drive shaft carried by said structure, a fork frame actuated by said shaft and adapted to move forwardly and rearwardly, a fork connected to said frame, means carried by said frame to cause said fork to move upwardly to deposit beets onto the conveyor, and means actuating the conveyor from said first means.

5. A beet loader comprising a base, an upwardly and rearwardly inclined conveyor trough carried by said base, an endless conveyor in said trough, a drive shaft carried by said trough, sprocket wheels secured to said shaft, a fork frame eccentrically and adjustably connected to said sprocket wheels whereby the fork frame is moved forwardly and rearwardly, a fork secured to said frame, means actuated by the sprocket wheels to cause the fork to move upwardly to deposit the beets onto the conveyor during the rearward movement of the fork, and means rotating the conveyor by said first means.

6. A beet loader comprising a base, a conveyor carried by said base, a drive shaft associated with said conveyor, sprocket wheels secured to said drive shaft, an elevating shaft supported above the conveyor, said elevating shaft carrying cranks, a fork frame eccentrically connected to said sprocket wheels, a fork secured to said frame, means driving the conveyor by the elevating shaft, a bar secured to the fork, elevating arms connected to the cranks of the elevating shaft and to the bar and each including a pair of sections pivotally connected together.

In testimony whereof I affix my signature in presence of two witnesses.

VICTOR CASTILLO.

Witnesses:
J. D. BLOEDORN,
ANSEL E. GRAVES.